US012597605B2

(12) United States Patent
Lho et al.

(10) Patent No.: US 12,597,605 B2
(45) Date of Patent: Apr. 7, 2026

(54) POSITIVE ELECTRODE MATERIAL FOR SECONDARY BATTERY AND LITHIUM SECONDARY BATTERY COMPRISING SAME

(71) Applicant: LG Energy Solution, Ltd., Seoul (KR)

(72) Inventors: Eun Sol Lho, Daejeon (KR); Sang Min Park, Daejeon (KR); Sung Bin Park, Daejeon (KR); Seul Ki Kim, Daejeon (KR); Wen Xiu Wang, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 885 days.

(21) Appl. No.: 17/640,616

(22) PCT Filed: Sep. 11, 2020

(86) PCT No.: PCT/KR2020/012337
§ 371 (c)(1),
(2) Date: Mar. 4, 2022

(87) PCT Pub. No.: WO2021/049918
PCT Pub. Date: Mar. 18, 2021

(65) Prior Publication Data
US 2022/0336806 A1 Oct. 20, 2022

(30) Foreign Application Priority Data
Sep. 11, 2019 (KR) ........................ 10-2019-0113125

(51) Int. Cl.
| | |
|---|---|
| *H01M 4/525* | (2010.01) |
| *H01M 4/02* | (2006.01) |
| *H01M 4/131* | (2010.01) |
| *H01M 4/134* | (2010.01) |
| *H01M 4/36* | (2006.01) |
| *H01M 10/0525* | (2010.01) |

(52) U.S. Cl.
CPC ........... *H01M 4/525* (2013.01); *H01M 4/131* (2013.01); *H01M 4/134* (2013.01); *H01M 4/364* (2013.01); *H01M 10/0525* (2013.01); *H01M 2004/028* (2013.01)

(58) Field of Classification Search
CPC ...... H01M 4/525; H01M 4/131; H01M 4/134; H01M 4/364; H01M 10/0525; H01M 2004/028
See application file for complete search history.

(56) References Cited

U.S. PATENT DOCUMENTS

| | | |
|---|---|---|
| 2009/0258296 A1 | 10/2009 | Kawasato et al. |
| 2012/0009476 A1 | 1/2012 | Park et al. |
| 2013/0183583 A1 | 7/2013 | Kim et al. |
| 2013/0244105 A1 | 9/2013 | Chang et al. |
| 2014/0030588 A1* | 1/2014 | Hong .................... H01M 4/131 |
| | | 429/188 |
| 2017/0149049 A1 | 5/2017 | Endoh et al. |
| 2017/0288223 A1* | 10/2017 | Ogawa .................. H01M 4/505 |
| 2018/0175388 A1* | 6/2018 | Han ........................ H01M 4/505 |
| 2018/0219212 A1* | 8/2018 | Seol ...................... H01M 4/364 |
| 2019/0036117 A1 | 1/2019 | Liu |
| 2019/0221829 A1* | 7/2019 | Kim ...................... H01M 4/364 |
| 2020/0014023 A1* | 1/2020 | Ko ......................... H01M 4/131 |
| 2020/0235381 A1 | 7/2020 | Park et al. |
| 2020/0266439 A1 | 8/2020 | Park et al. |

FOREIGN PATENT DOCUMENTS

| | | | | |
|---|---|---|---|---|
| CN | 102956878 A | 3/2013 | | |
| CN | 103797622 A | 5/2014 | | |
| CN | 108649216 A | 10/2018 | | |
| CN | 109817955 A | 5/2019 | | |
| JP | 2001163700 A | 6/2001 | | |
| JP | 2009242121 A | 10/2009 | | |
| JP | 5172835 B2 | 3/2013 | | |
| JP | 2015076154 A | 4/2015 | | |
| KR | 20120009891 A | 2/2012 | | |
| KR | 101328989 B1 | 11/2013 | | |
| KR | 20130135172 A | 12/2013 | | |
| KR | 20180056261 A | 5/2018 | | |
| KR | 20180077026 A | * | 7/2018 | ........ H01M 10/0525 |
| KR | 20180077081 A | 7/2018 | | |
| KR | 20190000457 A | 1/2019 | | |

(Continued)

OTHER PUBLICATIONS

Search report from International Application No. PCT/KR2020/012337, mailed Dec. 16, 2022.
Search Report dated Aug. 30, 2023 from the Office Action for Chinese Application No. 202080063634.5 issued Sep. 1, 2023, 4 pages. [See p. 2-3, categorizing the cited references].
Extended European Search Report for Application No. 20862757.0 dated Aug. 22, 2022. 9 pgs.

*Primary Examiner* — Nicole M. Buie-Hatcher
*Assistant Examiner* — Taylor Harrison Krone
(74) *Attorney, Agent, or Firm* — Lerner David LLP

(57) ABSTRACT

The present invention relates to a positive electrode material for a secondary battery, the positive electrode material including a first positive electrode active material and a second positive electrode active material, the first positive electrode active material and the second positive electrode active material being single particle types and lithium composite transition metal oxides including nickel, cobalt, and manganese and having a nickel content accounting for 60 mol % or more of total metals except for lithium, wherein the first positive electrode active material has a mean particle diameter ($D_{50}$) of 3 μm or less and a molar ratio (Li/M) of lithium to the metals (M) except for lithium of 1.10 to 1.20, and the second positive electrode active material has a mean particle diameter ($D_{50}$) of greater than 3 μm and a molar ratio (Li/M) of lithium to the metals (M) except for lithium of 1.00 to 1.13.

19 Claims, No Drawings

(56)        References Cited

FOREIGN PATENT DOCUMENTS

| | | | | | |
|---|---|---|---|---|---|
| KR | 20190041715 | A | 4/2019 | | |
| KR | 20190043855 | A | 4/2019 | | |
| KR | 20190054986 | A | 5/2019 | | |
| KR | 20190059483 | A | 5/2019 | | |
| KR | 20190093454 | A | 8/2019 | | |
| WO | 2017057078 | A1 | 4/2017 | | |
| WO | WO-2018150843 | A1 * | 8/2018 | ........... | H01M 4/364 |
| WO | 2019093869 | A2 | 5/2019 | | |

* cited by examiner

POSITIVE ELECTRODE MATERIAL FOR SECONDARY BATTERY AND LITHIUM SECONDARY BATTERY COMPRISING SAME

CROSS-REFERENCE TO RELATED APPLICATIONS

The present application is a national phase entry under 35 U.S.C. § 371 of International Application No. PCT/KR2020/012337 filed Sep. 11, 2020, which claims priority from Korean Patent Application No. 102019-0113125, filed on Sep. 11, 2019, the disclosures of which are incorporated herein by reference in their entirety.

TECHNICAL FIELD

The present invention relates to a positive electrode material for a secondary battery and a lithium secondary battery including the same.

BACKGROUND ART

With the recent rapid spread of electronic devices using batteries, such as mobile phones, notebook computers, and electric vehicles, the demand for small, lightweight, and relatively high-capacity secondary batteries is rapidly increasing. In particular, lithium secondary batteries are drawing attention as a driving power source for electronic devices due to light weight and high energy density thereof. Accordingly, research and development efforts have been actively made to enhance the performance of lithium secondary batteries.

In lithium secondary batteries, in the state where an organic electrolyte solution or a polymer electrolyte solution is filled between a positive electrode and a negative electrode, which include active materials capable of intercalating and deintercalating lithium ions, electric energy is produced by a redox reaction when the lithium ions are intercalated/deintercalated into/from the positive electrode and the negative electrode.

As a positive electrode active material of a lithium secondary battery, lithium cobalt oxide ($LiCoO_2$), lithium nickel oxide ($LiNiO_2$), lithium manganese oxide ($LiMnO_2$, $LiMn_2O_4$, or the like), a lithium iron phosphate compound ($LiFePO_4$), or the like is used. Among these, lithium cobalt oxide ($LiCoO_2$) is widely used due to advantages such as high operating voltage and excellent capacity characteristics, and is applied as a positive electrode active material for high voltage. However, due to the increased price and supply instability of cobalt (Co), there is a limitation in mass use as a power source in fields such as electric vehicles, and thus a need has emerged to develop a positive electrode active material which can replace lithium cobalt oxide.

Accordingly, a nickel-cobalt-manganese-based lithium composite transition metal oxide (hereinafter, simply referred to as an "NCM-based lithium composite transition metal oxide") in which some cobalt (Co) atoms are substituted with nickel (Ni) and manganese (Mn) has been developed. Recently, research has been conducted to increase the capacity by increasing a Ni content in the NCM-based lithium composite transition metal oxide. However, in the case of a Ni-rich positive electrode active material having a high nickel content, there are disadvantages such as a deterioration in thermal stability, increased resistance due to an increase in side reactions during an electrochemical reaction, and increased gas generation.

To compensate for this, attempts have been made to improve the deterioration in thermal stability and the increase in side reactions and resistance by minimizing the interface of secondary particles through over-calcination by increasing the calcining temperature when a positive electrode active material is prepared. However, a single-particle-type positive electrode material prepared by over-calcination has a longer Li ion diffusion path than a secondary particle positive electrode material, and has a problem in that output performance is highly deteriorated due to causes such as a surface rock-salt crystal structure caused by over-calcination.

CITED REFERENCE

Patent Document (Patent Document 1) Chinese Patent Publication No. 109817955

Technical Problem

The present invention provides a positive electrode material including, as a positive electrode active material, a Ni-rich NCM-based lithium composite transition metal oxide, in which thermal stability is enhanced by forming a single-particle-type positive electrode active material through over-calcination, increases in side reactions and resistance are suppressed, and the problems of single-particle-type positive electrode materials, such as a long Li ion diffusion path and a deterioration in output performance due to causes such as a surface rock-salt crystal structure, are improved.

Technical Solution

According to an aspect of the present invention, there is provided a positive electrode material for a secondary battery, the positive electrode material including a first positive electrode active material and a second positive electrode active material that are single particle types and lithium composite transition metal oxides including nickel, cobalt, and manganese and having a nickel content accounting for 60 mol % or more of total metals except for lithium, wherein the first positive electrode active material has a mean particle diameter ($D_{50}$) of 3 μm or less and has a molar ratio (Li/M) of lithium to the metals (M) except for lithium of 1.10 to 1.20, and the second positive electrode active material has a mean particle diameter ($D_{50}$) of greater than 3 μm and has a molar ratio (Li/M) of lithium to the metals (M) except for lithium of 1.00 to 1.13.

The present invention also provides a positive electrode and a lithium secondary battery including the positive electrode material.

Advantageous Effects of Invention

According to the present invention, in a Ni-rich NCM-based lithium composite transition metal oxide as a positive electrode active material, thermal stability is enhanced by forming a single-particle-type positive electrode active material through over-calcination, increases in side reactions and resistance are suppressed, and the problems of single-particle-type positive electrode materials, such as a long Li ion diffusion path and a deterioration in output performance due to causes such as a surface rock-salt crystal structure, can be improved.

DETAILED DESCRIPTION

Hereinafter, the present invention will be described in more detail to aid in understanding the present invention. The terms or words used in the present specification and claims should not be construed as being limited to ordinary or dictionary meanings, but should be construed as having meanings and concepts consistent with the spirit of the present invention based on the principle that an inventor can appropriately define terms to explain the invention of the inventor in the best way.

As used herein, "single-particle-type positive electrode active material" is a concept in contrast to a positive electrode active material in the form of a spherical secondary particle formed by agglomeration of tens to hundreds of primary particles, prepared using a conventional method, and refers to a positive electrode active material consisting of 10 or less primary particles. Specifically, in the present invention, the single-particle-type positive electrode active material may be in the form of a single particle consisting of one primary particle, or a secondary particle formed by agglomeration of several primary particles.

In the present specification, "primary particle" refers to the smallest unit of particles recognized when a positive electrode active material is observed through a scanning electron microscope, and "secondary particle" refers to a secondary structure formed by agglomeration of a plurality of primary particles.

In the present specification, over-calcination means calcination at a temperature that is about 50° C. to about 200° C. higher than an existing appropriate calcining temperature when a positive electrode active material is prepared. For example, in preparing a lithium composite transition metal oxide as a positive electrode active material having a molar ratio of Ni:Co:Mn of 8:1:1, an appropriate calcining temperature in the range of 670° C. to 750° C. is conventionally known, and over-calcination means calcination performed at 770° C. to 850° C.

In the present specification, the mean particle diameter ($D_{50}$) may be defined as a particle diameter corresponding to 50% of the cumulative volume in the particle size distribution curve. The mean particle diameter ($D_{50}$) may be measured using, for example, a laser diffraction method. For example, in the measurement method of the mean particle diameter ($D_{50}$) of the positive electrode active material, positive electrode active material particles may be dispersed in a dispersion medium, and then introduced into a commercially available laser diffraction particle size measurement device (e.g., Microtrac MT 3000), followed by irradiation of ultrasonic waves of about 28 kHz at a power of 40 W, and then the mean particle diameter ($D_{50}$) corresponding to 50% of the cumulative volume in the measurement device may be calculated.

<Positive Electrode Material>

The positive electrode material for a secondary battery according to the present invention includes a first positive electrode active material and a second positive electrode active material that are single particle types and lithium composite transition metal oxides including nickel, cobalt, and manganese and having a nickel content accounting for 60 mol % or more of total metals except for lithium, wherein the first positive electrode active material has a mean particle diameter ($D_{50}$) of 3 μm or less and has a molar ratio (Li/M) of lithium to the metals (M) except for lithium of 1.10 to 1.20, and the second positive electrode active material has a mean particle diameter ($D_{50}$) of greater than 3 μm and has a molar ratio (Li/M) of lithium to the metals (M) except for lithium of 1.00 to 1.13.

The first and second positive electrode active materials of the present invention are NCM-based lithium composite transition metal oxides including nickel (Ni), cobalt (Co), and manganese (Mn). The lithium composite transition metal oxides are Ni-rich NCM-based lithium composite transition metal oxides having a nickel content accounting for 60 mol % or more of the total content of the metals except for lithium (Li). More preferably, the content of nickel (Ni) may be 70 mol % or more, and more preferably 80 mol % or more. Since the content of nickel (Ni) with respect to the total content of the metals except for lithium (Li) of the lithium composite transition metal oxide satisfies 60 mol % or more, a higher capacity can be secured.

The lithium composite transition metal oxide may be represented by Formula 1 below.

$$Li_aNi_{1-b-c-d}Co_bMn_cQ_dO_{2+\delta} \qquad \text{[Formula 1]}$$

wherein, in Formula 1, Q is any one or more elements selected from the group consisting of Al, Mg, V, Ti, and Zr, $1.0 \leq a \leq 1.5$, $0 < b \leq 0.5$, $0 < c \leq 0.5$, $0 \leq d \leq 0.1$, $0 < b+c+d \leq 0.4$, and $-0.1 \leq \delta \leq 1.0$.

In the lithium composite transition metal oxide of Formula 1, Li may be included in an amount corresponding to a, that is, $1.0 \leq a \leq 1.5$. When a is less than 1.0, the capacity may be reduced, and when a exceeds 1.5, particles are sintered in a calcining process, and thus it may be difficult to prepare a positive electrode active material. When considering a significant effect of enhancing the capacity properties of the positive electrode active material according to the control of an Li content and the balance of sintering properties when an active material is prepared, the Li may be included, more preferably, in an amount satisfying $1.1 \leq a \leq 1.2$.

In the lithium composite transition metal oxide of Formula 1, Ni may be included in an amount corresponding to $1-(b+c+d)$, for example, $0.6 \leq 1-(b+c+d) < 1$. When the content of Ni in the lithium composite transition metal oxide of Formula 1 is 0.6 or more, an amount of Ni sufficient to contribute to charging and discharging may be secured, thereby securing high capacity. More preferably, Ni may be included in an amount satisfying $0.80 \leq 1-(b+c+d) \leq 0.99$.

In the lithium composite transition metal oxide of Formula 1, Co may be included in an amount corresponding to b, that is, $0 < b \leq 0.5$. When the content of Co in the lithium composite transition metal oxide of Formula 1 exceeds 0.5, an increase in cost may be incurred. When considering the significant effect of enhancing capacity characteristics due to the inclusion of Co, the Co may be included in an amount satisfying $0.05 \leq b \leq 0.2$.

In the lithium composite transition metal oxide of Formula 1, Mn may be included in an amount corresponding to c, that is, $0 < c \leq 0.5$. When c in the lithium composite transition metal oxide of Formula 1 exceeds 0.5, the output characteristics and capacity characteristics of a battery may rather be deteriorated, and the Mn may be included in an amount satisfying, more particularly, $0.05 \leq c \leq 0.2$.

In the lithium composite transition metal oxide of Formula 1, Q may be a doping element included in the crystal structure of the lithium composite transition metal oxide, and Q may be included in an amount corresponding to d, that is, $0 \leq d \leq 0.1$.

The positive electrode material including the lithium composite transition metal oxide of the present invention includes a first positive electrode active material and a second positive electrode active material that are single particle types. The positive electrode material including the first and second positive electrode active materials may be in the form of single particles having a mean particle diameter ($D_{50}$) in the range of 1 μm to 10 μm, more preferably a mean particle diameter ($D_{50}$) in the range of 2 μm to 7 μm, and more preferably, a mean particle diameter ($D_{50}$) in the range of 3 μm to 6 μm.

Since the first and second positive electrode active materials, i.e., the lithium composite transition metal oxides, satisfy a single particle type consisting of a primary particle, thermal stability may be enhanced, and the occurrence of side reactions may be hindered.

A method of preparing the single-particle-type positive electrode active material is not particularly limited, but the positive electrode active material may be prepared by over-calcination at a higher calcining temperature than the existing calcining temperature when a positive electrode active material is prepared, and in preparation thereof, additives such as a grain growth accelerator that aids in over-calcination may be used, or a starting material may be changed. The single-particle-type positive electrode active material may be formed by adding a lithium source (e.g., LiOH or $Li_2CO_3$) to a composite transition metal hydroxide (e.g., $Ni_{0.8}Co_{0.1}Mn_{0.1}(OH)_2$) including nickel, cobalt, and manganese and mixing the same, followed by over-calcination at 770° C. to 850° C. in an oxygen atmosphere for 10 hours to 20 hours.

The first positive electrode active material of the present invention has a mean particle diameter ($D_{50}$) of 3 μm or less and has a molar ratio (Li/M) of lithium to the metals (M) except for lithium of 1.10 to 1.20. The second positive electrode active material of the present invention has a mean particle diameter ($D_{50}$) of greater than 3 μm and has a molar ratio (Li/M) of lithium to the metals (M) except for lithium of 1.00 to 1.13. The molar ratio (Li/M) of lithium to the metals (M) except for lithium of the first positive electrode active material may be greater than the molar ratio (Li/M) of lithium to the metals (M) except for lithium of the second positive electrode active material.

Single-particle-type positive electrode materials have problems such as a long Li ion diffusion path as compared to secondary-particle-type positive electrode materials, and highly deteriorated output performance due to causes such as a surface rock-salt crystal structure caused by over-calcination. In contrast, the positive electrode material of the present invention includes first and second positive electrode active materials having different particle diameters and different molar ratios (Li/M) of lithium to the metals (M) except for lithium, and thus by applying the optimal Li/M in accordance with the particle size, the problems of single-particle-type positive electrode materials, such as a deterioration in output characteristics may be improved.

More preferably, the first positive electrode active material may have a mean particle diameter ($D_{50}$) of 1 μm to 3 μm, more preferably 1.5 μm to 2.5 μm, and the second positive electrode active material has a mean particle diameter ($D_{50}$) of 3.5 μm to 10 μm, more preferably 4 μm to 7 μm.

When the molar ratio (Li/M) of lithium to the metals (M) except for lithium in the first positive electrode active material is less than 1.10, the structure is highly likely to become unstable due to the formation of a rock-salt structure and cation mixing on particle surfaces. When the molar ratio (Li/M) exceeds 1.20, grain growth may not properly occur.

When the molar ratio (Li/M) of lithium to the metals (M) except for lithium in the second positive electrode active material is less than 1.00, the structure is highly likely to become unstable due to the formation of a rock-salt structure and cation mixing on particle surfaces. When the molar ratio (Li/M) exceeds 1.13, grain growth may not properly occur.

More preferably, the molar ratio (Li/M) of lithium to the metals (M) except for lithium of the first positive electrode active material may range from 1.13 to 1.17, more preferably, from 1.14 to 1.16.

More preferably, the molar ratio (Li/M) of lithium to the metals (M) except for lithium of the second positive electrode active material may range from 1.03 to 1.10, more preferably, from 1.05 to 1.07.

The first positive electrode active material and the second positive electrode active material may be mixed in a weight ratio of 30:70 to 5:95, more preferably 25:75 to 10:90, and more preferably 20:80 to 10:90. By mixing the first and second positive electrode active materials in the above weight ratio range, it may be possible to enhance output performance and prevent lifespan deterioration.

The first and second positive electrode active materials of the present invention may have a cation mixing ratio of nickel cations in a lithium layer in the structure of 1.5% or less, more preferably 1.0% or less, and more preferably 0.5% or less. Since the cation mixing ratio of nickel cations in the lithium layer satisfies 1.5% or less, structural stability may be secured.

<Positive Electrode and Lithium Secondary Battery>

Another embodiment of the present invention provides a positive electrode for a secondary battery and a lithium secondary battery including a positive electrode material prepared as described above.

Specifically, the positive electrode includes a positive electrode current collector and a positive electrode active material layer disposed on the positive electrode current collector and including the positive electrode material.

In the positive electrode, the positive electrode current collector is not particularly limited as long as it does not cause any chemical change in the fabricated battery and has conductivity, and may be, for example, stainless steel, aluminum, nickel, titanium, calcined carbon, or aluminum or stainless steel that is surface-treated with carbon, nickel, titanium, silver, or the like. In addition, the positive electrode current collector may generally have a thickness of 3 μm to 500 μm, and may be processed to have fine irregularities formed on the surface of the positive electrode current collector to enhance adhesion of the positive electrode material to the current collector. For example, the positive electrode current collector may be used in any of various forms including films, sheets, foils, nets, porous structures, foams, and non-woven fabrics.

In addition, the positive electrode active material layer may include a conductive material and a binder in addition to the above-described positive electrode material.

In this case, the conductive material is used to impart conductivity to an electrode, and is not particularly limited as long as it does not cause any chemical change in the fabricated battery and has electrical conductivity. Specific examples thereof include graphite such as natural graphite or artificial graphite; carbonaceous materials such as carbon black, acetylene black, Ketjen black, channel black, furnace black, lamp black, thermal black, and carbon fiber; metal powder or metal fiber such as copper, nickel, aluminum, or silver; conductive whiskers such as zinc oxide and potassium titanate; conductive metal oxides such as titanium oxide; and conductive polymers such as polyphenylene derivatives. One or a mixture of two or more of these materials may be used. The conductive material may be included in an amount of 1 wt % to 30 wt % with respect to a total weight of the positive electrode active material layer.

In addition, the binder serves to improve the adhesion between positive electrode active material particles and the adhesion between the positive electrode active material and the positive electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), sulfonated-EPDM, styrene-butadiene rubber (SBR), fluorine rubber, and various copolymers thereof. One or a mixture of two or more of these materials may be used. The binder may be included in an amount of 1 wt % to 30 wt % with respect to the total weight of the positive electrode active material layer.

The positive electrode may be manufactured according to a conventional positive electrode manufacturing method except for using the above-described positive electrode material. Specifically, a composition for forming a positive electrode active material layer, including the above-described positive electrode material and optionally, a binder and a conductive material, may be applied onto a positive electrode current collector, followed by drying and rolling, thereby completing the manufacture of a positive electrode. In this case, the types and amounts of the positive electrode material, the binder, and the conductive material are the same as those described above.

The solvent may be a solvent generally used in the art, and may be dimethyl sulfoxide (DMSO), isopropyl alcohol, N-methylpyrrolidone (NMP), acetone, water, or the like, and one or a mixture of two or more of these materials may be used. The amount of the used solvent is an amount sufficient to dissolve or disperse the positive electrode material, the conductive material, and the binder in consideration of the coating thickness and manufacturing yield of a slurry, and an amount sufficient to have a viscosity capable of exhibiting excellent thickness uniformity in subsequent coating for manufacturing a positive electrode.

Alternatively, the positive electrode may be manufactured by casting the composition for forming a positive electrode active material layer on a separate support, and then laminating a film separated from the support on a positive electrode current collector.

According to another embodiment of the present invention provides an electrochemical device including the positive electrode. The electrochemical device may specifically be a battery, a capacitor, or the like, and more specifically, may be a lithium secondary battery.

Specifically, the lithium secondary battery includes a positive electrode, a negative electrode provided to face the positive electrode, a separator disposed between the positive electrode and the negative electrode, and an electrolyte, and the positive electrode is the same as described above. In addition, the lithium secondary battery may optionally further include a battery case for accommodating an electrode assembly including the positive electrode, the negative electrode, and the separator, and a sealing member that seals the battery case.

In the lithium secondary battery, the negative electrode includes a negative electrode current collector and a negative electrode active material layer disposed on the negative electrode current collector.

The negative electrode current collector is not particularly limited as long as it does not cause any chemical change in the fabricated battery and has conductivity, and may be, for example, copper, stainless steel, aluminum, nickel, titanium, calcined carbon, copper or stainless steel that is surface-treated with carbon, nickel, titanium, silver, or the like, and aluminum-cadmium alloys. In addition, the negative electrode current collector may generally have a thickness of 3 μm to 500 μm, and, as in the positive electrode current collector, may be processed to have fine irregularities formed on the surface of the negative electrode current collector to enhance adhesion of the negative electrode active material to the current collector. For example, the negative electrode current collector may be used in any of various forms including films, sheets, foils, nets, porous structures, foams, and non-woven fabrics.

The negative electrode active material layer optionally includes a binder and a conductive material along with the negative electrode active material. For example, the negative electrode active material layer may be formed by applying a composition for manufacturing a negative electrode, including the negative electrode active material and optionally, a binder and a conductive material, onto the negative electrode current collector and drying the coated current collector, or may also be formed by casting the composition for manufacturing a negative electrode on a separate support, and then laminating a film separated from the support on a negative electrode current collector.

As the negative electrode active material, a compound capable of reversibly intercalating and deintercalating lithium may be used. Specific examples of the negative electrode active material include carbonaceous materials such as artificial graphite, natural graphite, graphitized carbon fibers, and amorphous carbon; metallic compounds alloyable with lithium, such as Si, Al, Sn, Pb, Zn, Bi, In, Mg, Ga, Cd, a Si alloy, a Sn alloy, or an Al alloy; metal oxides which may be doped and undoped with lithium, such as $SiO_\beta$ where $0<\beta<2$, $SnO_2$, vanadium oxide, and lithium vanadium oxide; and composites including the metallic compound and the carbonaceous material, such as a Si—C composite and a Sn—C composite. Any one or a mixture of two or more of these materials may be used. In addition, a metallic lithium thin film may also be used as the negative electrode active material. In addition, both low-crystalline carbon and high-crystalline carbon may be used as the carbon material. Typical examples of the low-crystalline carbon may be soft carbon and hard carbon, and typical examples of the high-crystalline carbon may be amorphous, platy, flaky, spherical or fibrous natural graphite or artificial graphite, Kish graphite, pyrolytic carbon, mesophase pitch-based carbon fibers, meso-carbon microbeads, mesophase pitches, and high-temperature calcined carbon such as petroleum or coal tar pitch derived cokes.

In addition, the binder and the conductive material may be the same as those described above with regard to the positive electrode.

Meanwhile, in the lithium secondary battery, the separator serves to separate the negative electrode and the positive electrode and provide a migration path for lithium ions. The separator is not particularly limited as long as it is used as a separator in a common lithium secondary battery, and, in particular, a separator which exhibits low resistance to migration of electrolyte ions and has an excellent electrolyte solution impregnation ability is preferable. Specifically, the separator may be a porous polymer film formed of a polyolefin-based polymer such as an ethylene homopolymer, a propylene homopolymer, an ethylene/butene copolymer, an ethylene/hexene copolymer, or an ethylene/methacrylate copolymer, or a stacked structure having two or more layers thereof. In addition, the separator may be a common porous non-woven fabric, for example, a non-woven fabric made of glass fiber with a high melting point, polyethylene terephthalate fiber, or the like. In addition, in order to ensure heat resistance or mechanical strength, the separator may be a coated separator including ceramic components or polymer materials, and optionally, may be used in a single-layer or multi-layer structure.

The electrolyte used in the present invention may be an organic liquid electrolyte, an inorganic liquid electrolyte, a solid polymer electrolyte, a gel-type polymer electrolyte, an inorganic solid electrolyte, a molten-type inorganic electrolyte, or the like, which may be used in the manufacture of a lithium secondary battery, but the present invention is not limited thereto.

Specifically, the electrolyte may include an organic solvent and a lithium salt.

The organic solvent is not particularly limited as long as it may act as a medium through which ions involved in an electrochemical reaction of a battery may migrate. Specific examples of the organic solvent include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a linear, branched, or cyclic $C_2$ to $C_{20}$ hydrocarbon and may include a double-bonded aromatic ring or an ether linkage); amides such as dimethylformamide; dioxolanes such as 1,3-dioxolane; and sulfolanes. Among these compounds, the carbonate-based solvent is preferable, and a mixture of a cyclic carbonate having high ionic conductivity and a high dielectric constant (e.g., ethylene carbonate or propylene carbonate) and a linear carbonate-based compound with low viscosity (e.g., ethyl methyl carbonate, dimethyl carbonate, or diethyl carbonate), which may increase the charging and discharging performance of a battery, is more preferable. In this case, when the cyclic carbonate and chain carbonate are mixed in a volume ratio of about 1:1 to about 1:9, an electrolyte solution may exhibit excellent performance.

The lithium salt is not particularly limited as long as it is a compound capable of providing lithium ions used in a lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$. The concentration of the lithium salt preferably ranges from 0.1 M to 2.0 M. When the concentration of the lithium salt is within the above range, since the electrolyte has appropriate conductivity and viscosity, excellent electrolyte performance may be exhibited, and effective migration of lithium ions is enabled.

In addition to the above-described components, in order to enhance lifespan characteristics of the battery, suppress a decrease in battery capacity, and enhance discharge capacity of the battery, the electrolyte may further include one or more additives such as a haloalkylene carbonate-based compound such as difluoroethylene carbonate and the like, pyridine, triethyl phosphite, triethanolamine, a cyclic ether, ethylene diamine, n-glyme, hexamethylphosphate triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum and trichloride. In this case, the additive(s) may be included in an amount of 0.1 wt % to 5 wt % with respect to the total weight of the electrolyte.

As described above, since the lithium secondary battery including the positive electrode material according to the present invention stably exhibits excellent discharge capacity, excellent output characteristics, and an excellent capacity retention rate, the lithium secondary battery is useful in fields of portable devices such as mobile phones, notebook computers, and digital cameras, and electric vehicles such as hybrid electric vehicles (HEVs).

Therefore, another embodiment of the present invention provides a battery module including the lithium secondary battery as a unit cell and a battery pack including the battery module.

The battery module or the battery pack may be used as power sources of any one or more medium- to large-sized devices selected from: power tools; electric vehicles including electric vehicles (EVs), hybrid EVs (HEVs), and plug-in hybrid EVs (PHEVs); and a system for storing electric power.

EXAMPLES

Hereinafter, examples of the present invention will be described in detail in such a manner that those skilled in the art to which the present invention pertains can easily carry out the present invention. However, the present invention may be embodied in many different forms and is not limited to the embodiments described herein.

Example 1

LiOH as a lithium source was added to $Ni_{0.8}Co_{0.1}Mn_{0.1}$ $(OH)_2$ as a positive electrode active material precursor so that the molar ratio of Li to M became 1.13 and the two materials were mixed, and then the resultant mixture was calcined at 770° C. in an oxygen atmosphere for 15 hours, thereby preparing, as a first positive electrode active material, single-particle-type $Li_{1.13}Ni_{0.8}Co_{0.1}Mn_{0.1}O_2$ having a mean particle diameter ($D_{50}$) of 2 μm.

LiOH as a lithium source was added to $Ni_{0.8}Co_{0.1}Mn_{0.1}$ $(OH)_2$ as a positive electrode active material precursor so that the molar ratio of Li to M became 1.07 and the two materials were mixed, and then the resultant mixture was calcined at 800° C. in an oxygen atmosphere for 15 hours, thereby preparing, as a second positive electrode active material, single-particle-type $Li_{0.07}Ni_{0.8}Co_{0.1}Mn_{0.1}O_2$ having a mean particle diameter ($D_{50}$) of 6 μm.

The first positive electrode active material and the second positive electrode active material were mixed in a weight ratio of 1:9, thereby completing the preparation of a positive electrode material.

Example 2

A positive electrode material was prepared in the same manner as in Example 1, except that, in preparing the first positive electrode active material, LiOH as a lithium source was added to $Ni_{0.8}Co_{0.1}Mn_{0.1}(OH)_2$ as a positive electrode active material precursor so that the molar ratio of Li to M became 1.17, thereby preparing, as the first positive electrode active material, single-particle-type $Li_{1.17}Ni_{0.8}Co_{0.1}Mn_{0.1}O_2$ having a mean particle diameter ($D_{50}$) of 2 μm.

Example 3

A positive electrode material was prepared in the same manner as in Example 1, except that, in preparing the first positive electrode active material, LiOH as a lithium source was added to $Ni_{0.8}Co_{0.1}Mn_{0.1}(OH)_2$ as a positive electrode active material precursor so that the molar ratio of Li to M became 1.1, thereby preparing, as the first positive electrode active material, single-particle-type $Li_{1.1}Ni_{0.8}Co_{0.1}Mn_{0.1}O_2$ having a mean particle diameter ($D_{50}$) of 2 µm.

Example 4

A positive electrode material was prepared in the same manner as in Example 1, except that, in preparing the first positive electrode active material, LiOH as a lithium source was added to $Ni_{0.8}Co_{0.1}Mn_{0.1}(OH)_2$ as a positive electrode active material precursor so that the molar ratio of Li to M became 1.15, thereby preparing, as the first positive electrode active material, single-particle-type $Li_{1.15}Ni_{0.8}Co_{0.1}Mn_{0.1}O_2$ having a mean particle diameter ($D_{50}$) of 2 µm, and in preparing the second positive electrode active material, LiOH as a lithium source was added to $Ni_{0.8}Co_{0.1}Mn_{0.1}(OH)_2$ as a positive electrode active material precursor so that the molar ratio of Li to M became 1.1, thereby preparing, as the second positive electrode active material, single-particle-type $Li_{1.1}Ni_{0.8}Co_{0.1}Mn_{0.1}O_2$ having a mean particle diameter ($D_{50}$) of 6 µm.

Comparative Example 1

LiOH as a lithium source was added to $Ni_{0.8}Co_{0.1}Mn_{0.1}(OH)_2$ as a positive electrode active material precursor so that the molar ratio of Li to M became 1.0 and the two materials were mixed, and then the resultant mixture was calcined at 780° C. in an oxygen atmosphere for 15 hours, thereby preparing single-particle-type $Li_{1.0}Ni_{0.8}Co_{0.1}Mn_{0.1}O_2$ (positive electrode material) having a mean particle diameter ($D_{50}$) of 4 µm.

Comparative Example 2

Singe-particle-type $Li_{1.1}Ni_{0.8}Co_{0.1}Mn_{0.1}O_2$ (positive electrode material) having a mean particle diameter ($D_{50}$) of 4 µm was prepared in the same manner as in Comparative Example 1, except that LiOH as a lithium source was added to $Ni_{0.8}Co_{0.1}Mn_{0.1}(OH)_2$ as a positive electrode active material precursor so that the molar ratio of Li to M became 1.1.

Comparative Example 3

Singe-particle-type $Li_{1.2}Ni_{0.8}Co_{0.1}Mn_{0.1}O_2$ (positive electrode material) having a mean particle diameter ($D_{50}$) of 4 µm was prepared in the same manner as in Comparative Example 1, except that LiOH as a lithium source was added to $Ni_{0.8}Co_{0.1}Mn_{0.1}(OH)_2$ as a positive electrode active material precursor so that the molar ratio of Li to M became 1.2.

Comparative Example 4

LiOH as a lithium source was added to $Ni_{0.8}Co_{0.1}Mn_{0.1}(OH)_2$ as a positive electrode active material precursor so that the molar ratio of Li to M became 1.0 and the two materials were mixed, and then the resultant mixture was calcined at 800° C. in an oxygen atmosphere for 15 hours, thereby preparing single-particle-type $Li_{1.0}Ni_{0.8}Co_{0.1}Mn_{0.1}O_2$ (positive electrode material) having a mean particle diameter ($D_{50}$) of 6 µm.

Comparative Example 5

Singe-particle-type $Li_{1.1}Ni_{0.8}Co_{0.1}Mn_{0.1}O_2$ (positive electrode material) having a mean particle diameter ($D_{50}$) of 6 µm was prepared in the same manner as in Comparative Example 4, except that LiOH as a lithium source was added to $Ni_{0.8}Co_{0.1}Mn_{0.1}(OH)_2$ as a positive electrode active material precursor so that the molar ratio of Li to M became 1.1.

Comparative Example 6

LiOH as a lithium source was added to $Ni_{0.8}Co_{0.1}Mn_{0.1}(OH)_2$ as a positive electrode active material precursor so that the molar ratio of Li to M became 1.2 and the two materials were mixed, and then the resultant mixture was calcined at 770° C. in an oxygen atmosphere for 15 hours, thereby preparing single-particle-type $Li_{1.2}Ni_{0.8}Co_{0.1}Mn_{0.1}O_2$ (positive electrode material) having a mean particle diameter ($D_{50}$) of 2 µm.

Comparative Example 7

LiOH as a lithium source was added to $Ni_{0.8}Co_{0.1}Mn_{0.1}(OH)_2$ as a positive electrode active material precursor so that the molar ratio of Li to M became 1.0 and the two materials were mixed, and then the resultant mixture was calcined at 770° C. in an oxygen atmosphere for 15 hours, thereby preparing, as a first positive electrode active material, single-particle-type $Li_{1.0}Ni_{0.8}Co_{0.1}Mn_{0.1}O_2$ having a mean particle diameter ($D_{50}$) of 2 µm.

LiOH as a lithium source was added to $Ni_{0.8}Co_{0.1}Mn_{0.1}(OH)_2$ as a positive electrode active material precursor so that the molar ratio of Li to M became 0.98 and the two materials were mixed, and then the resultant mixture was calcined at 800° C. in an oxygen atmosphere for 15 hours, thereby preparing, as a second positive electrode active material, single-particle-type $Li_{0.98}Ni_{0.8}Co_{0.1}Mn_{0.1}O_2$ having a mean particle diameter ($D_{50}$) of 6 µm.

A positive electrode material was prepared in the same manner as in Example 1, except that single-particle-type $Li_{1.0}Ni_{0.8}Co_{0.1}Mn_{0.1}O_2$ having a mean particle diameter ($D_{50}$) of 2 µm was used as the first positive electrode active material, and single-particle-type $Li_{0.98}Ni_{0.8}Co_{0.1}Mn_{0.1}O_2$ having a mean particle diameter ($D_{50}$) of 6 µm was used as the second positive electrode active material.

Comparative Example 8

LiOH as a lithium source was added to $Ni_{0.8}Co_{0.1}Mn_{0.1}(OH)_2$ as a positive electrode active material precursor so that the molar ratio of Li to M became 1.3 and the two materials were mixed, and then the resultant mixture was calcined at 770° C. in an oxygen atmosphere for 15 hours, thereby preparing, as a first positive electrode active material, single-particle-type $Li_{1.3}Ni_{0.8}Co_{0.1}Mn_{0.1}O_2$ having a mean particle diameter ($D_{50}$) of 2 µm.

LiOH as a lithium source was added to $Ni_{0.8}Co_{0.1}Mn_{0.1}(OH)_2$ as a positive electrode active material precursor so that the molar ratio of Li to M became 1.2 and the two materials were mixed, and then the resultant mixture was calcined at 800° C. in an oxygen atmosphere for 15 hours, thereby preparing, as a second positive electrode active material, single-particle-type $Li_{1.2}N_{0.8}Co_{0.1}Mn_{0.1}O_2$ having a mean particle diameter ($D_{50}$) of 6 µm.

A positive electrode material was prepared in the same manner as in Example 1, except that single-particle-type $Li_{1.3}Ni_{0.8}Co_{0.1}Mn_{0.1}O_2$ having a mean particle diameter ($D_{50}$) of 2 µm was used as the first positive electrode active material, and single-particle-type $Li_{1.2}Ni_{0.8}Co_{0.1}Mn_{0.1}O_2$ having a mean particle diameter ($D_{50}$) of 6 µm was used as the second positive electrode active material.

Experimental Example 1: Room-Temperature Resistance Characteristics

Each of the positive electrode materials prepared according to Examples 1 to 4 and Comparative Examples 1 to 8, carbon black as a conductive material, and PVdF as a binder were mixed in a weight ratio of 96:2:2 in N-methylpyrrolidone as a solvent to prepare a positive electrode mixture (viscosity: 5000 mPa·s), and the positive electrode mixture was applied onto one surface of an aluminum current collector and dried at 130° C. and pressed, thereby completing the manufacture of a positive electrode.

Li metal was used as a negative electrode.

A porous polyethylene separator was disposed between the manufactured positive electrode and the negative electrode to manufacture an electrode assembly, and the electrode assembly is placed in a case, and then an electrolyte solution was injected into the case, thereby completing the manufacture of a lithium secondary battery. In this case, the electrolyte solution was prepared by dissolving 1.0 M lithium hexafluorophosphate ($LiPF_6$) in an organic solvent including ethylene carbonate (EC)/ethyl methyl carbonate (EMC)/diethyl carbonate (DEC) (a mixing volume ratio of EC/EMC/DEC of 3:4:3).

Each of the lithium secondary battery half-cells manufactured as described above was charged/discharged within a range of 3.0 V to 4.25 V at 0.2 C in a CCCV mode and 25° C., and then set to SOC 10%, and the resistance at 10 seconds and room temperature during discharging at 1 C was measured, and the results thereof are shown in Table 1 below.

TABLE 1

| | Room temperature resistance (Ω) |
|---|---|
| Example 1 | 22.9 |
| Example 2 | 24.1 |
| Example 3 | 25.5 |
| Example 4 | 22.6 |
| Comparative Example 1 | 32.9 |
| Comparative Example 2 | 31.0 |
| Comparative Example 3 | 31.9 |
| Comparative Example 4 | 37.4 |
| Comparative Example 5 | 35.6 |
| Comparative Example 6 | 30.6 |
| Comparative Example 7 | 31.5 |
| Comparative Example 8 | 33.8 |

Referring to Table 1, it can be confirmed that the cases of Examples 1 to 4 exhibited significantly enhanced resistance characteristics at room temperature, as compared to the cases of Comparative Examples 1 to 8, which used only one type of a positive electrode active material, or in which the Li/M ratio according to the mean particle diameters of single-particle-type first and second positive electrode active materials was not controlled within the range of the present invention.

Experimental Example 2: Low-Temperature Output Characteristics

A lithium secondary battery full cell was manufactured using each of the positive electrode materials prepared according to Examples 1 to 4 and Comparative Examples 1 to 8. The lithium secondary battery full cell was manufactured in the same manner as in Experimental Example 1, except that graphite as a negative electrode active material, carbon black as a conductive material, and PVdF as a binder were mixed in a weight ratio of 96:2:2 in N-methylpyrrolidone as a solvent to prepare a negative electrode mixture, and the negative electrode mixture was applied onto one surface of a copper current collector, dried at 130° C., and then pressed, thereby completing the manufacture of the full cell.

Each of the manufactured lithium secondary battery full cells was set to SOC 35% at 25° C., and then the resistance at 450 seconds when discharging was performed at −10° C. and 0.4 C was measured, and the results thereof are shown in Table 2 below.

TABLE 2

| | Low temperature output (Ω) |
|---|---|
| Example 1 | 24.1 |
| Example 2 | 25.2 |
| Example 3 | 25.5 |
| Example 4 | 24.8 |
| Comparative Example 1 | 29.1 |
| Comparative Example 2 | 28.5 |
| Comparative Example 3 | 28.3 |
| Comparative Example 4 | 32.8 |
| Comparative Example 5 | 31.3 |
| Comparative Example 6 | 26.3 |
| Comparative Example 7 | 28.2 |
| Comparative Example 8 | 30.5 |

Referring to Table 2, it can be confirmed that the cases of Examples 1 to 4 exhibited significantly enhanced low-temperature output characteristics, as compared to the cases of Comparative Examples 1 to 8 in which the Li/M ratio according to the mean particle diameters of single-particle-type first and second positive electrode active materials was not controlled within the range of the present invention.

The invention claimed is:

1. A positive electrode material for a secondary battery, the positive electrode material comprising a first positive electrode active material and a second positive electrode active material, the first positive electrode active material and the second positive electrode active material being single-particle-types and lithium composite transition metal oxides comprising nickel, cobalt, and manganese and having a nickel content accounting for 60 mol % or more of total metals except for lithium,
 wherein the first positive electrode active material has a mean particle diameter ($D_{50}$) of 3 µm or less and a molar ratio (Li/M) of lithium to the metals (M) except for lithium of 1.10 to 1.20,
 wherein the second positive electrode active material has a mean particle diameter ($D_{50}$) of greater than 3 µm and a molar ratio (Li/M) of lithium to the metals (M) except for lithium of 1.00 to 1.13, and wherein a single-particle-type positive electrode material consists of one primary particle or an agglomeration of ten or less primary particles.

2. The positive electrode material of claim 1, wherein the molar ratio (Li/M) of lithium to the metals (M) except for lithium of the first positive electrode active material is greater than the molar ratio (Li/M) of lithium to the metals (M) except for lithium of the second positive electrode active material.

3. The positive electrode material of claim 1, wherein the first positive electrode active material has a molar ratio (Li/M) of lithium to the metals (M) except for lithium of 1.13 to 1.17.

4. The positive electrode material of claim 1, wherein the second positive electrode active material has a molar ratio (Li/M) of lithium to the metals (M) except for lithium of 1.03 to 1.10.

5. The positive electrode material of claim 1, wherein the first positive electrode active material has a mean particle diameter ($D_{50}$) of 1 μm to 3 μm.

6. The positive electrode material of claim 1, wherein the second positive electrode active material has a mean particle diameter ($D_{50}$) of 3.5 μm to 10 μm.

7. The positive electrode material of claim 1, wherein a cation mixing ratio of nickel cations in a lithium layer in a structure of the lithium composite transition metal oxide is 1.5% or less.

8. The positive electrode material of claim 7, wherein the cation mixing ratio of nickel cations in a lithium layer in a structure of the lithium composite transition metal oxide is 1.0% or less.

9. The positive electrode material of claim 1, wherein the positive electrode material comprising the first and second positive electrode active materials is a single particle type having a mean particle diameter ($D_{50}$) of 1 μm to 10 μm.

10. The positive electrode material of claim 1, wherein the first positive electrode active material and the second positive electrode active material are mixed in a weight ratio of 30:70 to 5:95.

11. The positive electrode material of claim 1, wherein the lithium composite transition metal oxide is represented by Formula 1 below:

$$Li_aNi_{1-b-c-d}Co_bMn_cQ_dO_{2+\delta} \qquad \text{[Formula 1]}$$

wherein, in Formula 1, Q is any one or more elements selected from the group consisting of Al, Mg, V, Ti, and Zr, $1.0 \leq a \leq 1.5$, $0 < b \leq 0.5$, $0 < c \leq 0.5$, $0 \leq d \leq 0.1$, $0 < b+c+d \leq 0.4$, and $-0.1 \leq \delta \leq 1.0$.

12. A positive electrode for a secondary battery, the positive electrode comprising the positive electrode material according to claim 1.

13. A lithium secondary battery comprising the positive electrode according to claim 12.

14. The positive electrode material of claim 1, wherein the nickel content accounts from 60 mol % to 99 mol % of the total metals except for lithium.

15. The positive electrode material of claim 1, wherein the nickel content accounts from 70 mol % to 99 mol % of the total metals except for lithium.

16. The positive electrode material of claim 1, wherein the nickel content accounts from 80 mol % to 99 mol % of the total metals except for lithium.

17. The positive electrode material of claim 1, wherein the second positive electrode active material has a mean particle diameter ($D_{50}$) from 3 μm to 10 μm.

18. The positive electrode material of claim 1, wherein a cation mixing ratio is from 0.1% to 1.5%.

19. A positive electrode material for a secondary battery, the positive electrode material comprising a first positive electrode active material and a second positive electrode active material, the first positive electrode active material and the second positive electrode active material being single-particle-types and lithium composite transition metal oxides comprising nickel, cobalt, and manganese and having a nickel content accounting for 60 mol % or more of total metals except for lithium, wherein the first positive electrode active material has a mean particle diameter ($D_{50}$) of 3 μm or less and a molar ratio (Li/M) of lithium to the metals (M) except for lithium of 1.10 to 1.20, wherein the second positive electrode active material has a mean particle diameter ($D_{50}$) of greater than 3 μm and a molar ratio (Li/M) of lithium to the metals (M) except for lithium of 1.00 to 1.13, wherein the molar ratio (Li/M) of the first positive electrode active material is different than the molar ratio (Li/M) of the second positive electrode active material, and wherein a single-particle-type positive electrode material consists of one primary particle or an agglomeration of ten or less primary particles.

* * * * *